United States Patent
Robinson et al.

(10) Patent No.: US 8,624,954 B2
(45) Date of Patent: Jan. 7, 2014

(54) METHODS AND SYSTEMS FOR SHARING CONTENT VIA A COLLABORATION SCREEN

(75) Inventors: Ian N. Robinson, Pebble Beach, CA (US); Kar-Han Tan, Sunnyvale, CA (US); Daniel George Gelb, Redwood City, CA (US)

(73) Assignee: Hewlett-Packard Developement Company, L.P., Houston, TX (US)

( * ) Notice: Subject to any disclaimer, the term of this patent is extended or adjusted under 35 U.S.C. 154(b) by 251 days.

(21) Appl. No.: 13/097,481

(22) Filed: Apr. 29, 2011

(65) Prior Publication Data

US 2012/0274727 A1    Nov. 1, 2012

(51) Int. Cl.
*H04N 7/14*    (2006.01)

(52) U.S. Cl.
USPC ............................. 348/14.07; 348/14.01

(58) Field of Classification Search
USPC ............ 348/14.01–14.16, E5.144, E5.104, 348/E5.137; 715/761; 455/566; 345/1.1, 345/178
See application file for complete search history.

(56) References Cited

U.S. PATENT DOCUMENTS

| | | | | |
|---|---|---|---|---|
| 5,400,069 A * | 3/1995 | Braun et al. | ............... | 348/14.16 |
| 5,956,180 A * | 9/1999 | Bass et al. | .................... | 359/479 |
| 7,605,719 B1 | 10/2009 | Wenger et al. | | |
| 7,703,013 B1 | 4/2010 | Bauermeister et al. | | |
| 2008/0246834 A1 * | 10/2008 | Lunde et al. | ............... | 348/14.09 |
| 2008/0297589 A1 * | 12/2008 | Kurtz et al. | ............... | 348/14.16 |
| 2010/0257457 A1 | 10/2010 | De Goes | | |

OTHER PUBLICATIONS

Lueble et al~"Collaborative Environments Supported by large Screen Displays"~CSCE'02~Nov. 2002~pp. 2.
Pavlovych et al~"Effect of Screen Configuration and Interaction Devices in Shared Display Groupware"~HCC'O8~Oct. 31, 2008~pp. 49-56.
Sullivan et al~"Active Collaboration Room"~Cisco White Paper~May 2010~pages.

* cited by examiner

*Primary Examiner* — Curtis Kuntz
*Assistant Examiner* — Sunita Joshi (57) ABSTRACT

Video conferencing methods and systems that enable shared content to be displayed in a separate window within a screen or in a separate display are described. In one aspect, a method for establishing a video conference with shared content using a computing device includes capturing images of a first participant through a screen using a camera. The screen is located between the first participant and the camera. The method also includes projecting images of a second participant on the screen to be viewed by the first participant using a projector, and displaying shared content separate from the images of the second participant. The shared content is to be presented in different format than the images of the second participant presented on the screen.

19 Claims, 8 Drawing Sheets

METHODS AND SYSTEMS FOR SHARING CONTENT VIA A COLLABORATION SCREEN

TECHNICAL FIELD

This disclosure relates to video-conferencing technology.

BACKGROUND

Video conferencing enables participants located at two or more sites to simultaneously interact via two-way video and audio transmissions. A video conference can be as simple as a conversation between two participants located at different sites or involve discussions between many participants each located at different sites and include any shared content such as a video presentation. As high-speed network connectivity has become more widely available at lower cost and the cost of video capture and display technologies continues to decrease, video conferencing conducted over networks between participants in faraway places has become increasingly popular. Video conferencing is typically conducted using video cameras and webcams to capture images of the participants; computer monitors, televisions, and projectors to display video images of the participants and any shared video content; microphones and speakers to capture and project voices; and computers to process and send the video and audio signals over a network.

However, many video-conferencing systems are limited with respect to the manner in which shared content, such as photographs, are displayed. For example, consider video-conferencing systems implemented with a screen and a projector to project images of participants and shared content onto the screen. The projector projects the shared content and the participants as a single image onto the same screen. As a result, the resolution of the photographs is lower than desired. Designers and users of video-conference technologies continue to seek improvements in the video-conferencing experience.

DETAILED DESCRIPTION

Video conferencing methods and systems that enable shared content to be displayed in a separate window within a screen or in a separate display are described. The separate window or display can be used to present shared content with a desired format.

Figure 1:
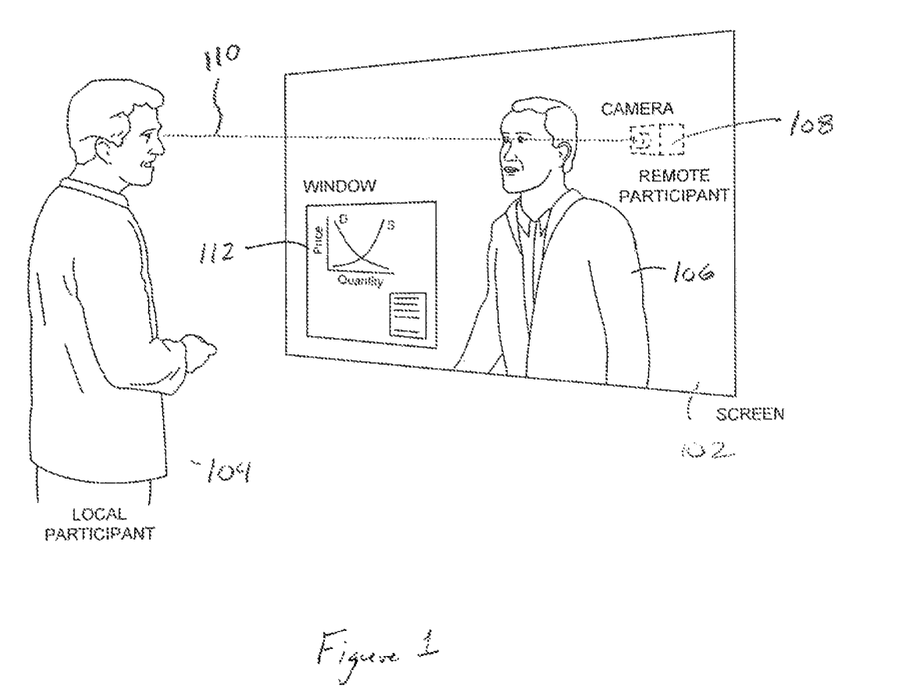
FIG. 1 shows an example of two video-conferencing participants interacting through a screen.

FIG. 1 shows an example of two video-conferencing participants interacting through a screen 102. The screen 102 enables a local participant 104 to interact with a remotely located participant 106. The remote participant 106 can be presented on the screen 102 to appear substantially life size to the local participant 104. A camera 108 is positioned behind the screen 102 at approximately eye level to the local participant 104, and the screen 102, described below, enables the camera 108 to capture images of the local participant 104 through the screen 102. The camera 108 can be positioned at a distance from the rear surface of the screen 102, so that its viewpoint is roughly equivalent to that of the remote participant 106. In order to capture gestures made by the local participant 104, the camera 108 can be positioned so that camera's field of view encompasses approximately the entire screen 102. Images of the participants 104 and 106 are captured at their respective sites and processed so that perceived eye contact and accurate gaze awareness is created between the participants. For example, as shown in FIG. 1, the image of the remote participant 106 is projected onto the screen 102 so that when the local participant 104 looks at the remote participant's face, local participant 102 looks along a line of sight represented by dashed line 110 that passes approximately between the eyes of the remote participant's image and into the lens of the camera 108. As a result, the local participant 104 perceives eye contact with the remote participant 106, and by looking into the lens of the camera 108, that same experience can be recreated at the remote participant's site.

In the example shown in FIG. 1, the screen 102 is also used to present shared content within a window 112 projected onto the screen 102. The window 112 can also be presented at the remote participant's sites with the correct orientation. In order to display the window 112 for the local participant 104 with a desired resolution and/or degree of blending with the image of the remote participant presented on the screen 102, two separate projectors can be used.

Figure 2:
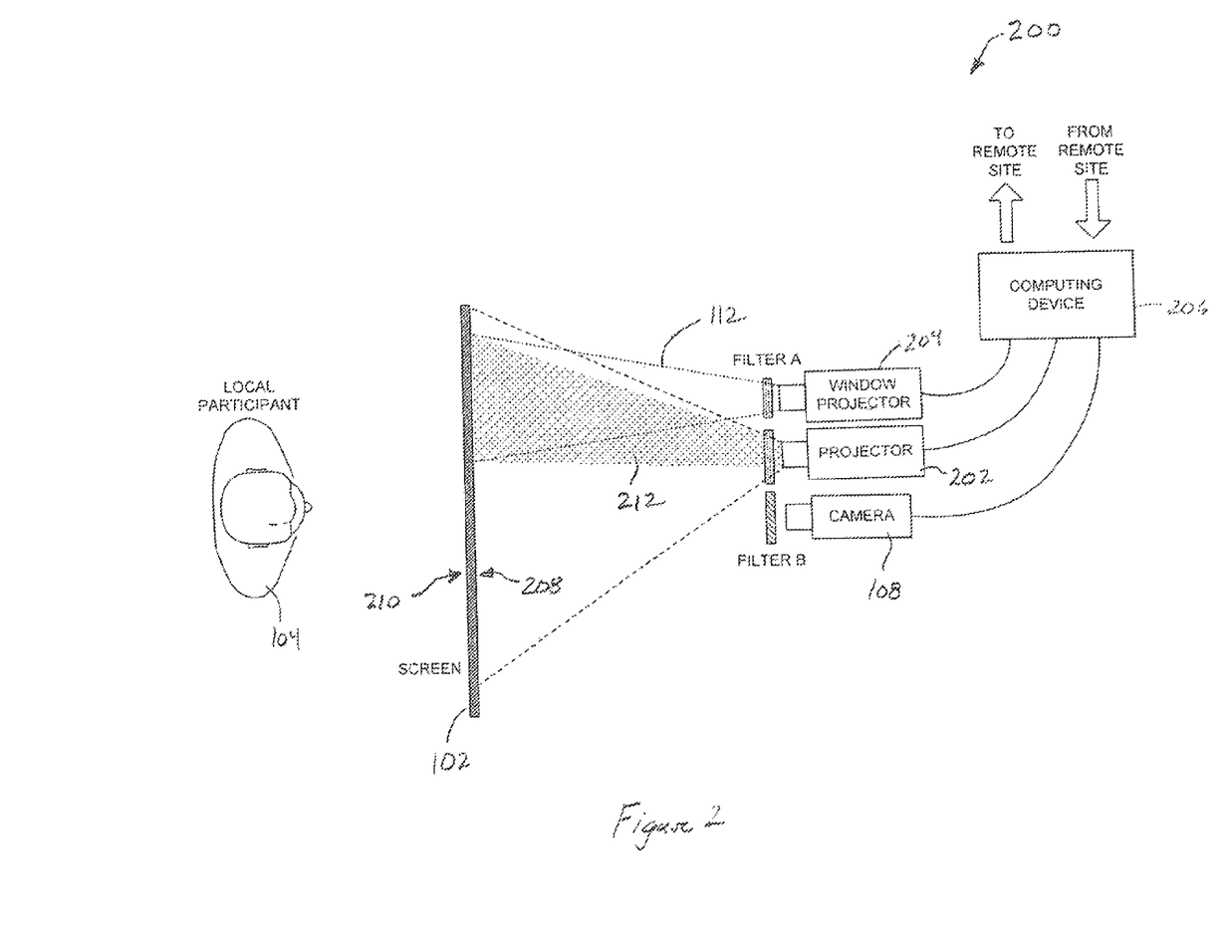
FIG. 2 shows a top-plan view and schematic representation of an example visual-collaborative system.

FIG. 2 shows a top-plan view and schematic representation of an example visual-collaborative system 200. The system 200 includes the screen 102, the camera 108, a projector 202, a window projector 204, and a computing device 206. The projector 202 projects the image of the remote participant 106, and the window projector 204 projects only the window 112. The camera 108 and projectors 202 and 204 are connected to the computing device 206, and the camera 108 and projectors 202 and 204 are positioned to face the rear surface 208 of the screen 102. In certain system 200 embodiments, the screen 102 can be composed of a relatively low concentration of light diffusing particles that diffuses light striking the rear surface 208 within a range of angles. The projectors 202 and 204 are positioned to project images onto the rear surface 208 within this range of angles to enable the local participant 102 facing the front surface 210 of the screen 102 to see the images projected by the projectors 202 and 204. The screen 102 also transmits light scattered from objects that face the front surface 210. In other words, the camera 108 is positioned to face the rear surface 208 so that light scattered off of objects that face the front surface 210 pass through the screen 102 and are captured as images by the camera 108. Alternatively, the screen 102 can be a holographic film that accepts light from the projector 202 within a first range of angles and transmits light that is visible to the local participant 104 within a second range of viewing angles. The holographic film is otherwise transparent. In this case, the widow projector 204 can be configured to project from a location close to the projector 202.

The camera 108 generates a video data stream encoding images captured through the screen 102. The video streams can then be sent over a network, such as the Internet or a local area network, to the remote participant's site for video processing. The computing device 206 also receives video data streams encoding images captured at the remote participant's site and the shared content and processes the video streams so that the shared content is projected by the window projector 204 onto the window 112 and the images captured of the remote participant 106 are projected onto the screen 102.

In order to prevent ambient light from striking the rear surface 208 and reducing the contrast between the projected and captured images, the system 200 can include a housing (not shown) that encloses the camera 108 and projectors 202 and 204. The screen 102 is located within an opening of the housing to only allow light to enter and exit the housing through the screen 102.

As shown in FIG. 2, the system 200 includes filters A and B. The two A filters are positioned so that light output from the projectors 202 and 204 passes through the A filters, and the filter B is positioned so that light captured by the camera 108 passes through filter B. The filters A and B prevent light produced by the projectors 202 and 204 and scattered back by the screen 102 toward the camera 108 from interfering with light transmitted through the screen 102 and captured by the camera 108. Note that the filters A and B are shown separately from the projectors 202 and 204 for the sake of convenience. In practice, the filters A and B can also be incorporated into the camera 108 and projectors 202 and 204 optical components.

In certain embodiments, filter B transmits a first set of wavelength ranges that when combined create the visual sensation of a much broader range of colors in images captured by the camera 108, while the A filters transmit a second set of wavelength ranges that are different from the first set of wavelength ranges. The second set of wavelength ranges can also be used to create the visual sensation of a much broader range of colors. In other words, the A and B filters in combination block the wavelength ranges that are used to create images on the screen 102 from entering the camera 108. Even though the wavelength ranges used to produce images on the screen 102 are different from the wavelengths of light used to capture images by the camera 108, the projectors 202 and 204 can still use the colors transmitted through the two A filters to project full color images, and light transmitted through filter B can still be used to capture full color images. It is the component wavelengths of the light used to project and capture the full color images that are prevented from interfering.

In other embodiments, the A and B filters can be polarizing filters that prevent the light produced by the projectors 202 and 204 from interfering with light transmitted through the screen 102 and captured by the camera 108. For example, the A and B filters can be linear polarizing filters oriented so that A filters pass only horizontally polarized light and the B filter passes only vertically polarized light, or the A and B filters can be circular polarizing filters where the A filters pass only right-circularly polarized light and the B filter passes only left-circularly polarized light.

In certain embodiments, in order to prevent the window 112 from overlapping with a portion of the full screen 102 image of the remote participant, the projector 202 projects the image of the remote participant 106 with a blank region in which the window 112 is to be projected onto the screen 102 using the window projector 204. For example, as shown in FIG. 2, when the participants 104 and 106 desire to present shared content in the separate window 112, the projector 202 projects the image of the remote participant onto the rear surface 208 of the screen 102 with a blank region 212 of a particular size and shape and located away from the center of the screen 102. The window projector 204 projects the window 112 onto the blank region 112 with the same size and shape as the blank region 212.

Figure 3:
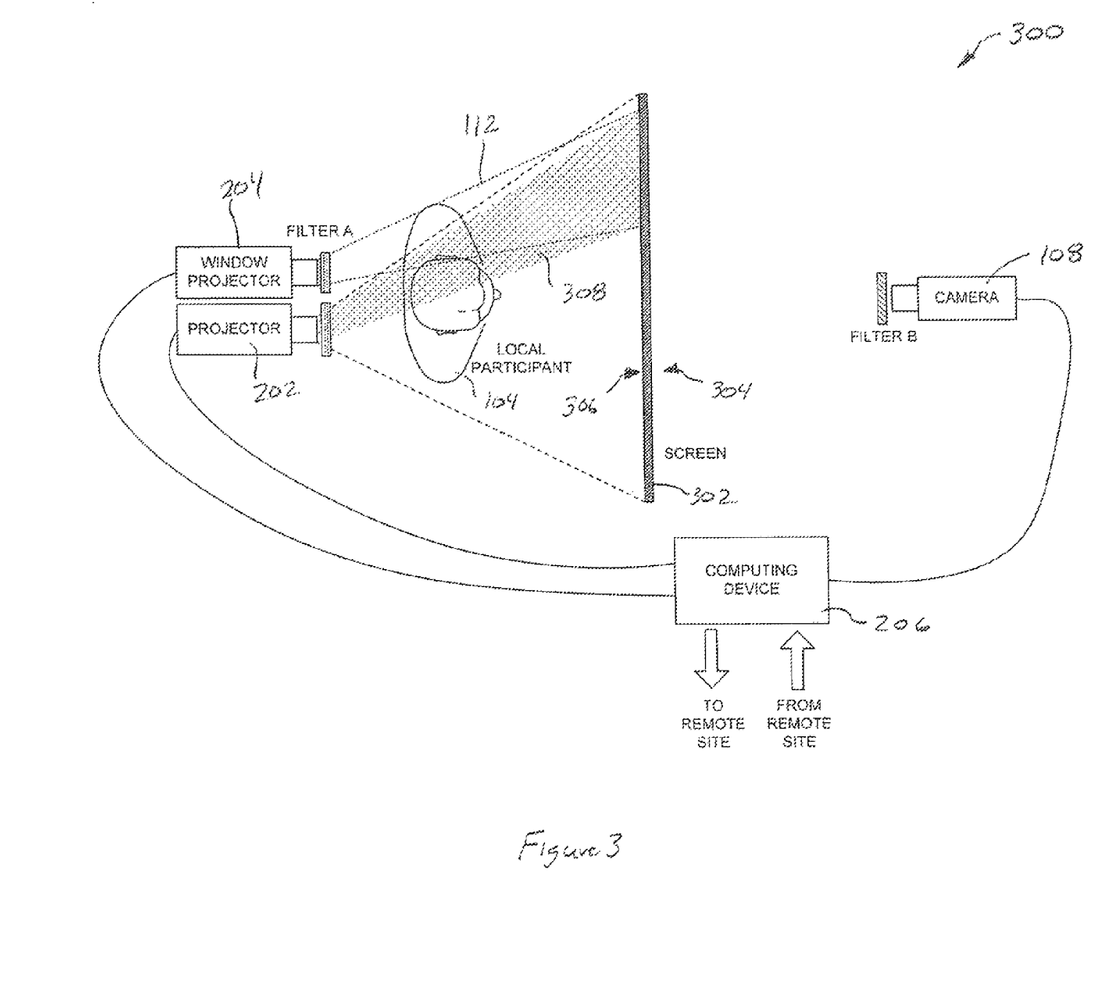
FIG. 3 shows a top-plan view and schematic representation of an example visual-collaborative system.

FIG. 3 shows a top-plan view and schematic representation of an example visual-collaborative system 300. The system 300 is similar to the system 200 with many of the same components including camera 108, projectors 202 and 204, A and B filters, and a computing device 206, but the screen 102 associated with the system 200 is replaced by a front projection screen 302. The camera 108 faces the rear surface 304 of the screen 302 and captures images through the screen 302. The projectors 202 and 204 project images onto the front surface 306 of the screen 302. In particular, the projector 202 projects the image of the remote participant onto the front surface 306 of the screen 302 with a blank region 308 of a particular size and shape and located away from the center of the screen 102. The window projector 204 projects the window 112 onto the blank region 112 with the same size and shape as the blank region 308.

The relative intensities of the window 112 and the image of the remote participant 106 can be separately controlled. For example, when the local participant 104 desires to pay close attention to the content displayed in the window 112, the participant 104 can increase the intensity level of the window 112 above that of the image of the remote participant 106 presented on the screen 102. In addition, the window projector 204 can be a high-resolution projector that can be adjusted to display the shared content with a higher resolution than the image of the remote participant 106 presented on the display 102 or adjusted to display the shared content with approximately the same resolution and intensity as the projector 202. The window projector 204 can be configured to project shared content with a higher dynamic range of colors than the projector 202. The window projector 204 can be configured to project images with a larger color gamut than the projector 202. The window projector 204 can be operated to alternate projecting right-eye and left-eye views to produce three-dimensional images for the local participant 104. In other embodiments, a second window projector (not shown) can be included in the systems 200 and 300 such that the window projector 204 and the second window projector can project right-eye and left-eye views of three-dimensional images to create a three-dimensional viewing experience for the local participant 104.

Figure 4:
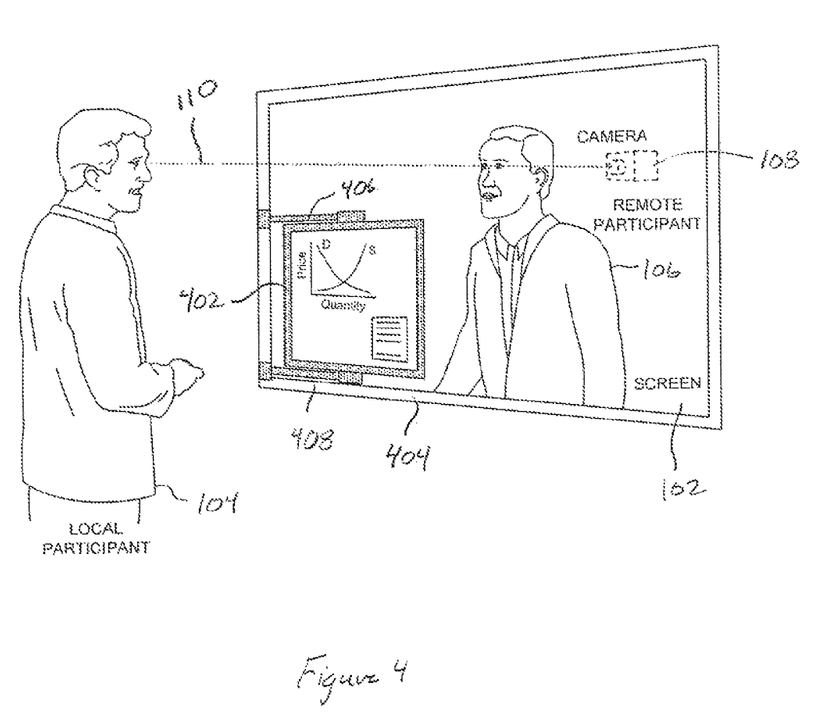
FIG. 4 shows an example of two video-conferencing participants interacting through the screen with a separate display for presenting shared content.

FIG. 4 shows an example of two video-conferencing participants interacting through the screen 102 and includes a separate display 402 for displaying shared content. As described above with reference to FIGS. 1-3, the screen 102 enables the local participant 104 to interact with the remote participant 106 in life size and the camera 108 is positioned behind the screen 102 at approximately the local participant's eye level to create the perception of eye contact between the local participant 102 and the remote participant 106. As shown in the example of FIG. 4, the display 402 is connected to a frame 404 surrounding the screen 102 or wall by top and bottom hinges 406 and 408. The display 402 is mounted and positioned in a lower portion of the screen 102 so that the local participant 104 can view the shared content and view the remote participant 106. The top and bottom hinges 406 and 408 enable the local participant to adjust the horizontal position of the display 402.

Figure 5A:
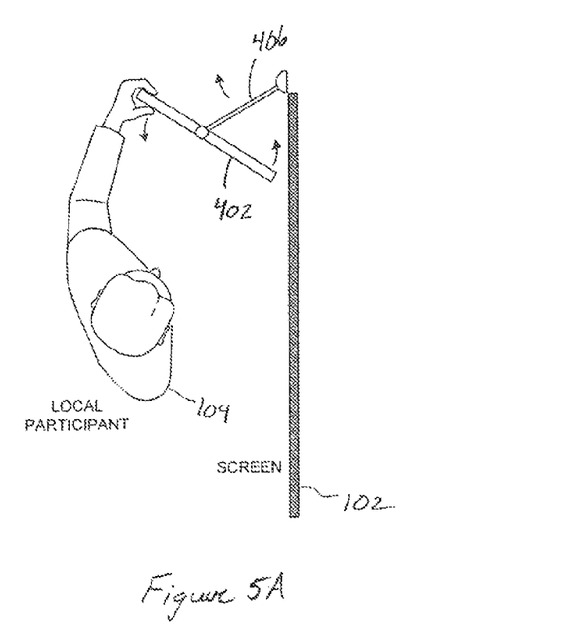
FIGS. 5A-5B show a local participant repositioning and using a display positioned off to the side of a screen.
Figure 5B:
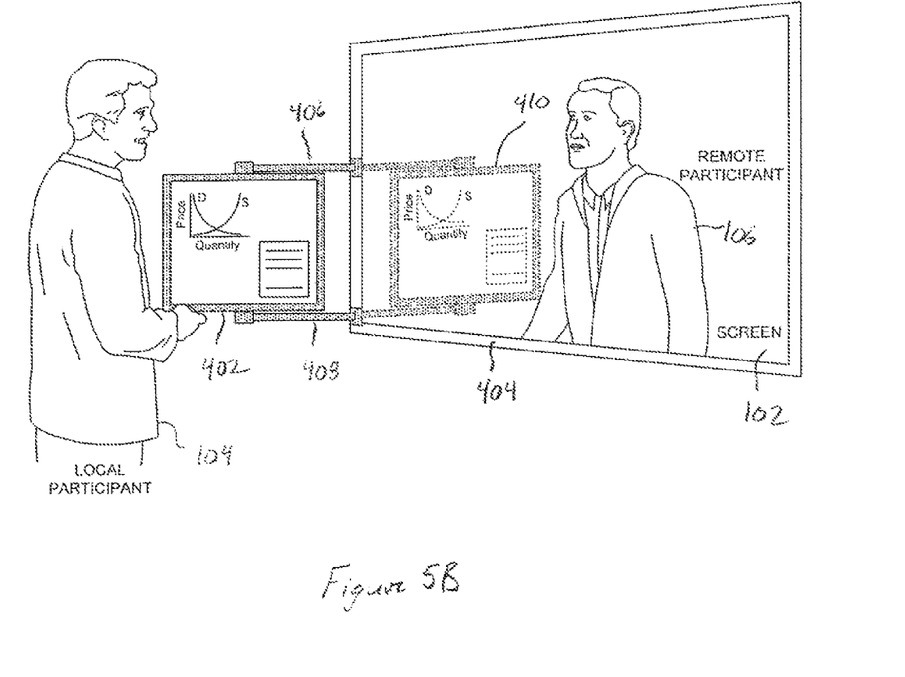

FIG. 5A shows a top-view of the local participant 104 in the process of repositioning the display 402 off to the side of the screen 102. FIG. 5B shows the display 402 positioned to the side of the screen 102 and an analogous display 410 positioned in a similar manner and presenting the same shared content at the remote participant's site. In this example, the participants 104 and 106 can each refer to the same shared content side by side without covering portions of their respective screens. Alternatively, the hinges 406 and 408 can be replaced by a single hinge arm that allows the display 402 to be moved horizontally and vertically.

Figure 6:
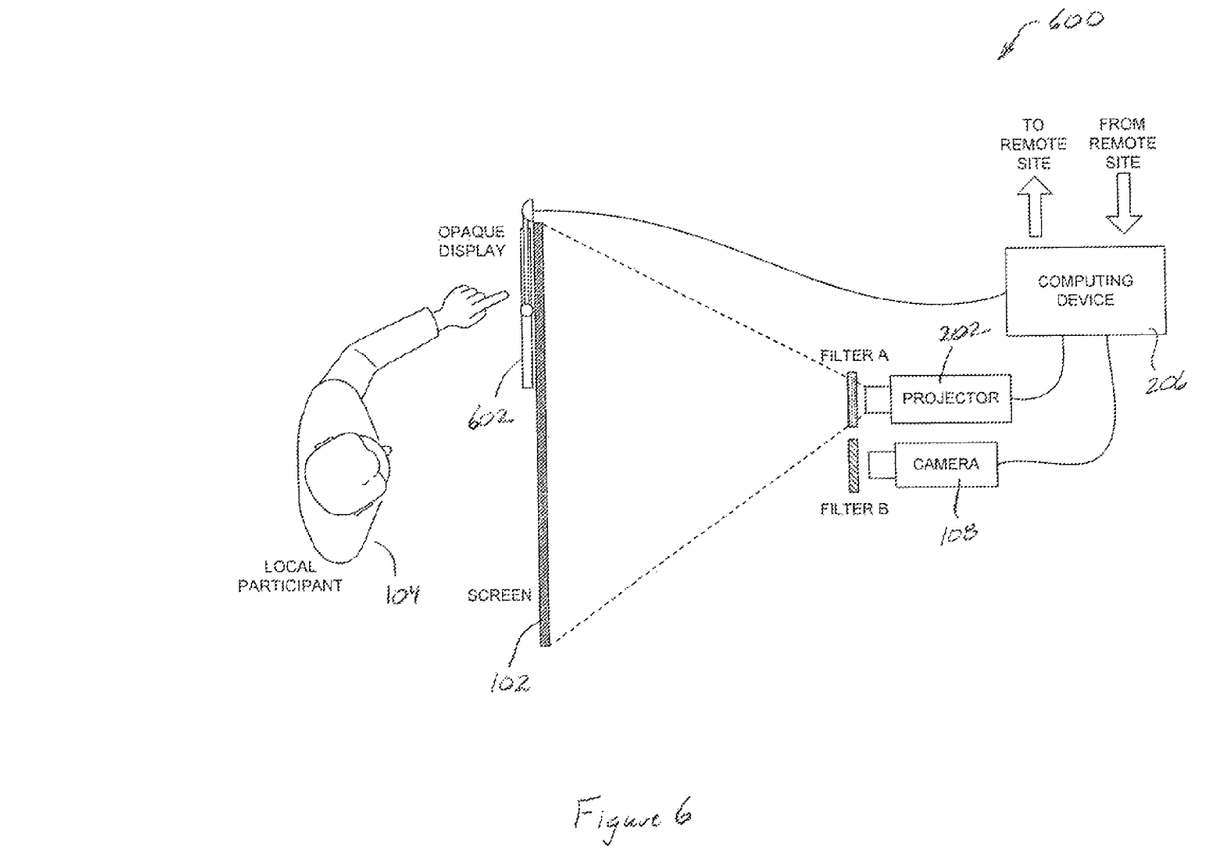
FIG. 6 shows a top-plan view and schematic representation of an example visual-collaborative system.

FIG. 6 shows a top-plan view and schematic representation of an example visual-collaborative system 600. The system 600 is similar to the system 200 in that the system 600 includes the rear projection screen 102, projector 202, camera 108, and computing device 206 that are operated in the same manner described above with reference to FIG. 2. However, the window projector 204 of the system 200 is replaced in the system 600 by an opaque, flat panel display 602. As shown in the example of FIG. 6, the projector 202, camera 108, and display 602 are connected to the computing device 206. The camera 108 generates a video data stream encoding images captured through the screen 102. The video streams can be sent over a network to the remote participant's site for video processing. The computing device 206 also receives video data streams encoding images captured at the remote participant's site. The projector 202 projects the video streams of the remote participant onto the screen 102 and any shared content is presented on the display 602.

The display 602 can be a high-resolution display to display shared content with a higher resolution than the images projected by the projector 202. The display 602 can also display shared content with a higher dynamic range of colors than the projector 202. The display 602 can be configured to display images with a larger color gamut than the projector 202. The display 602 can be a three-dimensional display or a glasses-free, three-dimensional display.

The display 602 can include a touchscreen so that when the display 402 is positioned in front of the screen 102, as shown in FIG. 6, it is still possible for the local participant 104 to convey gestures regarding the shared to the remote participant's display. For example, as shown in FIG. 6, it is not possible to capture a portion of the local participant's image obscured by the display 602. However, the touchscreen of the display 602 can be used to generate a cursor on the remote participant's display when the local participant 104 touches the touchscreen of the display 602 to identify the subject matter the local participant 104 would like to call to the attention of the remote participant 106. At the location on the touchscreen touched by the local participant 104, a cursor appears at approximately the same location on the display of the remote participant 106. Alternatively, the local participant 104 can write or draw on the screen of the display 602 with a stylus or the local participant's finger and corresponding markings appear in the same locations on the display of the remote participant 106.

Figure 7:
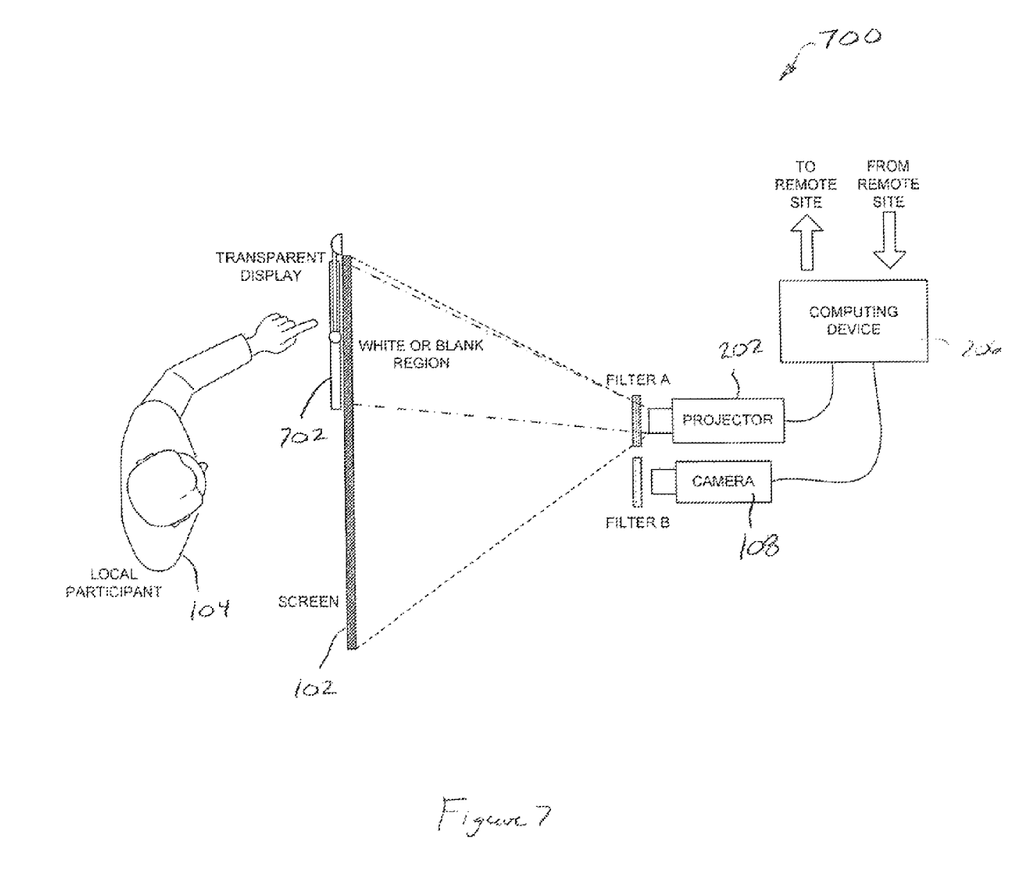
FIG. 7 shows a top-plan view and schematic representation of an example visual-collaborative system.

FIG. 7 shows a top-plan view and schematic representation of an example visual-collaborative system 700. The system 700 is similar to the system 600, except the opaque display 602 is replaced by a high-resolution, transparent display 702. The background of the remote participant's site projected onto the screen 102 may interfere with viewing the shared content presented on the transparent display 702. As a result, the projector 202 can be operated as described above with reference to FIG. 2 to project a blank or white region with the same size and shape and location of the display 702 to enhance the quality of the shared content presented on the display 702. In certain embodiments, the transparent display 702 can be a transparent organic light-emitting diode ("OLED") display When the display 702 is a transparent OLED-based display, the projector 202 can be operated to present a black region on the screen 102 behind the display 702 In other embodiments, the transparent display 702 can be a transparent liquid crystal display. When the display 702 is a transparent LCD-based display, the projector 202 can be operated to present a white region on the screen 102 behind the display 702. In embodiments using a transparent display 702, the filter B of the camera 108 may not have to be configured to reject light from the display 702, because the area in the camera-captured image that corresponds to the display is replaced by a blank rectangle as a background for the display at the receiving system.

The display 702 can be a high-resolution display to present shared content with a higher resolution than the images projected by the projector 202. The display 702 can also present shared content with a higher dynamic range of colors than the projector 202. The display 702 can be configured to present images with a larger color gamut than the projector 202. The display 702 can be a three-dimensional display or a glasses-free, three-dimensional display.

The video-conferencing systems 200, 300, and 600 may also include a signal means to assist the local participant 104 and remote participant 106 to set up their respective shared content displays in the same way. For example, when the shared content is projected in the window 112 described above with reference to systems 200 and 300, the window projector 204 of the local participant 104 and a similar window projection of the remote participant 106 conic on at approximately the same time and project the shared content so that the shared content windows appear to be opposite one another. Alternatively, when the shared content is presented on the display 402 off to the side, as shown in FIG. 5B, the local participant 104 and the remote participant 106 are prompted to set up the displays 402 and 410 appropriately. In another embodiment, the system 600 may include sensors that detect the position of the display 402 in front of the screen 102.

Methods described above can also work with video-conferencing systems that provide for different forms of displaying shared content or do not include a window projector or separate display. For example, suppose the local participant 104 is using one of the systems 200, 300, and 600 described above and the remote participant 106 uses a video-conferencing system that is not capable of separately displaying shared content in either a separate window on a screen or on a separate display. The remote participant 106 can open a shared content window in a matching position to that of the local participant 104 using the same projector the remote participant uses to project the image of the local participant 104 onto the remote participant's screen.

Figure 8:
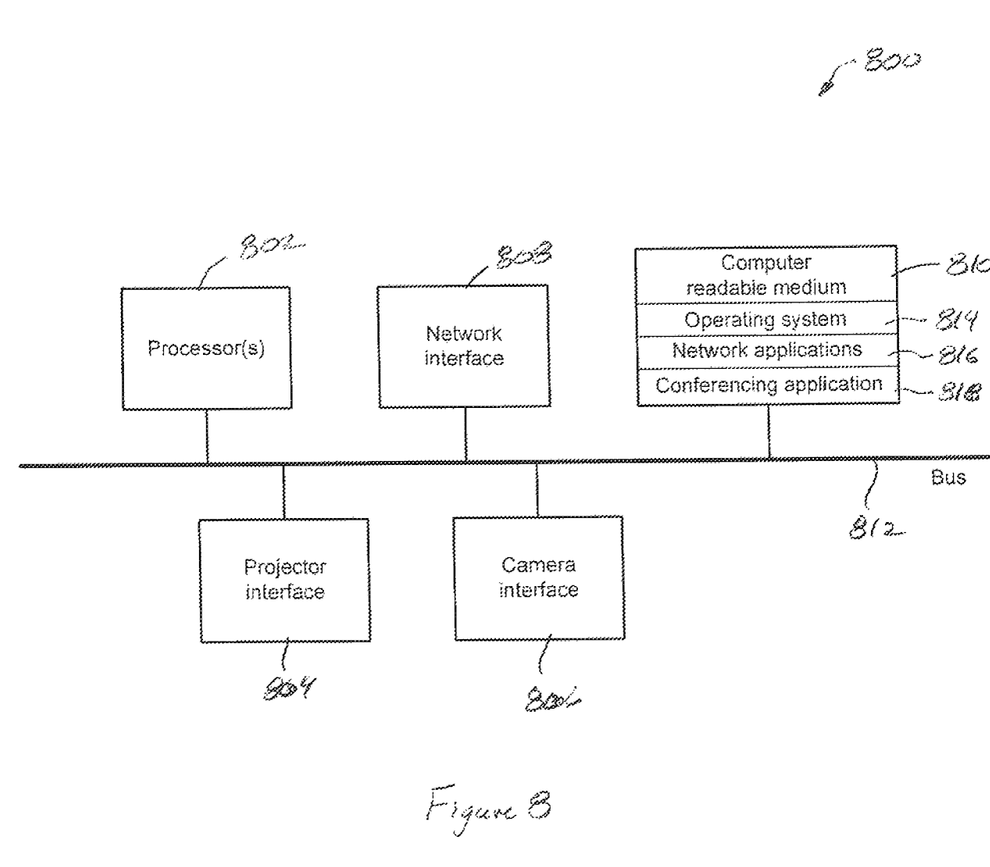
FIG. 8 shows a schematic representation of a computing device.

The computing device 206 can be a desktop computer, a laptop, or any other suitable device configured to carry out video and image processing. In certain embodiments, the computing device 206 can be integrated in the projector 202 or the camera 108. FIG. 8 shows a schematic representation of a computing device 800. The device 800 may include one or more processors 802; one or more projector interfaces 804; a video or camera interface 806; one or more network interfaces 808, such as a Local Area Network LAN, a wireless 802.11x LAN, a 3G mobile WAN or a WiMax WAN; and one or more computer-readable mediums 810. Each of these components is operatively coupled to one or more buses 812. For example, the bus 812 can be an EISA, a PCI, a USB, a FireWire, a NuBus, or a PDS.

The computer-readable medium 810 can be any suitable medium that participates in providing instructions to the processor 802 for execution. For example, the computer-readable medium 810 can be non-volatile media, such as an optical disk, a magnetic disk, or a magnetic disk drive; and volatile media, such as memory. The computer-readable medium 810 can also store computer-readable instructions, including word processors, browsers, email, Instant Messaging, media players, and telephony software.

The computer-readable medium 810 may also store an operating system 814, such as Mac OS, MS Windows, Unix, or Linux; network applications 816; and a video-conferencing application 818. The operating system 814 can be multi-user, multiprocessing, multitasking, multithreading, and real-time. The operating system 814 can also perform basic tasks such as recognizing input from input devices, such as a keyboard, a keypad, or a mouse; sending output to a projector and a camera; keeping track of files and directories on medium 810; controlling peripheral devices, such as disk drives, printers, image capture device; and managing traffic on the one or more buses 812. The network applications 816 includes various components for establishing and maintaining network connections, such as computer-readable instructions for implementing communication protocols including TCP/IP, HTTP, Ethernet, USB, and FireWire.

The video-conference application 818 provides various computer-readable instruction components for sharing content between video conference participants, as described above. In certain embodiments, some or all of the processes performed by the application 818 can be integrated into the operating system 814. In certain embodiments, the processes can be at least partially implemented in digital electronic circuitry, or in computer hardware, or in any combination thereof.

Video conferencing methods and systems are not intended to be limited to the system components described above. Video conferencing methods and systems can be implemented using any one of the various systems and methods for filtering, projecting, sharing content, capturing images, and variety of screens and displays described in the following three U.S. patent applications owned by the Hewlett Packard Co., all three of which are hereby incorporated by reference in their entirety: U.S. patent application filed on Apr. 29, 2009 having U.S. Ser. No. 12/432,550; U.S. patent application filed on Jan. 28, 2009, having U.S. Ser. No. 12/321,996; and U.S. patent application filed Jan. 27, 2010 having U.S. Ser. No. 12/694,743.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A method for establishing a video conference with shared content, the method comprising:
capturing images of a first participant through a screen using a camera, wherein the captured images are to be communicated to a second participant;
projecting, by a first projector, images of the second participant on the screen, wherein the first projector is to cause a blank region to be displayed on the screen at an inset location of the projected images of the second participant; and
projecting, by a second projector, the shared content onto the blank region, the projected shared content having approximately a same size and shape as the blank region, wherein the shared content comprises content that is shared between the first participant and the second participant.

2. The method of claim 1, wherein projecting the shared content onto the blank region further comprises projecting the shared content with a higher intensity level than the intensity level of the images of the second participant.

3. The method of claim 1, wherein projecting the shared content onto the blank region further comprises projecting the shared content with a higher dynamic range than the projected images of the second participant.

4. The method of claim 1, wherein projecting the shared content onto the blank region further comprises projecting the shared content with a larger color gamut than the projected images of the second participant.

5. The method of claim 1, wherein projecting the shared content onto the blank region further comprises projecting the shared content for three-dimensional viewing.

6. The method of claim 1, further comprising causing the blank region to be displayed in a location of the screen that is away from a center of the screen.

7. A method for establishing a video conference with shared content, the method comprising:
capturing images of a first participant through a screen using a camera, wherein the captured images are to be communicated to a second participant;
projecting, by a projector, images of the second participant on the screen;
projecting, by the projector, a predetermined region on the screen to have a uniform color, wherein the predetermined region is inset within the projected images of the second participant on the screen; and
displaying the shared content on a transparent flat panel display, wherein the transparent flat panel display is positioned in front of the predetermined region projected onto the screen and wherein the predetermined region on the screen has approximately a same size and shape as the transparent flat panel display, wherein the shared content comprises content that is shared between the first participant and the second participant.

8. The method of claim 7, wherein the transparent flat panel display is positioned on an opposite side of the screen as the projector.

9. The method of claim 7, wherein the transparent flat panel display is positioned at a location offset from a center of the screen.

10. The method of claim 7, wherein the transparent flat panel display further comprises one of a transparent light-emitting diode display and a transparent liquid crystal display.

11. The method of claim 7, wherein the predetermined region has a quadrilateral shape and the uniform color of the predetermined region is one of black and white.

12. The method of claim 7, wherein displaying the shared content on the transparent flat panel display further comprises displaying the shared content with a higher intensity level than the intensity level of the projected images of the second participant on the screen.

13. The method of claim 7, wherein displaying the shared content on the transparent flat panel display further comprises displaying the shared content with a higher dynamic range than the projected images of the second participant.

14. The method of claim 7, wherein displaying the shared content on the transparent flat panel display further comprises displaying the shared content with a larger color gamut than the projected images of the second participant.

15. The method of claim 7, wherein displaying the shared content on the transparent flat panel display further comprises displaying the shared content on the transparent flat panel display for three-dimensional viewing.

16. A non-transitory computer-readable medium having instructions encoded thereon for establishing a video conference with shared content, wherein the instructions are to cause one or more processors to:

cause a camera to capture images of a first participant through a screen to be communicated to a second participant;

cause a first projector to project images of a second participant on the screen while causing a blank region to be displayed on the screen at an inset location of the projected images of the second participant; and cause a second projector to project shared content onto the blank region, the projected shared content having approximately a same size and shape as the blank region, and wherein the shared content comprises content that is shared between the first participant and the second participant.

17. The non-transitory computer-readable medium of claim 16, wherein the second projector is to project the shared content onto the blank region with at least one of a higher intensity level, higher dynamic range, and larger color gamut than the first projector is to project the images of the second participant.

18. The non-transitory computer-readable medium of claim 16, wherein the second projector is to project the shared content onto the blank region for three-dimensional viewing.

19. The non-transitory computer-readable medium of claim 16, wherein the second projector is to further cause the blank region to be displayed at a location of the screen that is away from a center of the screen.

* * * * *

UNITED STATES PATENT AND TRADEMARK OFFICE
CERTIFICATE OF CORRECTION

PATENT NO.       : 8,624,954 B2
APPLICATION NO.  : 13/097481
DATED            : January 7, 2014
INVENTOR(S)      : Ian N. Robinson et al.

Page 1 of 1

It is certified that error appears in the above-identified patent and that said Letters Patent is hereby corrected as shown below:

On the title page, item (73), Assignee, in column 1, line 1, delete "Developement" and insert
-- Development --, therefor.

Signed and Sealed this
Sixteenth Day of September, 2014

Michelle K. Lee
*Deputy Director of the United States Patent and Trademark Office*